United States Patent
Fischer et al.

(10) Patent No.: US 11,533,344 B2
(45) Date of Patent: Dec. 20, 2022

(54) METHOD FOR ESTABLISHING A STREAM, METHOD FOR PROVIDING STREAM IDENTIFICATION INFORMATION, DOMAIN NAME SYSTEM (DNS) SERVER, DEVICE COMPUTER PROGRAM AND COMPUTER-READABLE MEDIUM

(71) Applicant: Siemens Aktiengesellschaft, Munich (DE)

(72) Inventors: Thomas Fischer, Erlangen (DE); Stephan Höme, Schwabach (DE); Konstantin Jung, Feucht (DE); Harald Albrecht, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/269,563

(22) PCT Filed: Aug. 15, 2019

(86) PCT No.: PCT/EP2019/071913
§ 371 (c)(1),
(2) Date: Feb. 19, 2021

(87) PCT Pub. No.: WO2020/038820
PCT Pub. Date: Feb. 27, 2020

(65) Prior Publication Data
US 2021/0306385 A1    Sep. 30, 2021

(30) Foreign Application Priority Data
Aug. 20, 2018    (EP) .................................... 18189716

(51) Int. Cl.
*H04L 65/1073*    (2022.01)
*H04L 47/28*    (2022.01)
(Continued)

(52) U.S. Cl.
CPC ........ *H04L 65/1073* (2013.01); *H04L 47/286* (2013.01); *H04L 61/4511* (2022.05); *H04L 65/65* (2022.05); *H04L 2101/35* (2022.05)

(58) Field of Classification Search
CPC .............. H04L 65/1073; H04L 47/286; H04L 61/1511; H04L 61/305; H04L 65/608
See application file for complete search history.

(56) References Cited

U.S. PATENT DOCUMENTS

2002/0099842 A1    7/2002    Jennings et al.
2005/0226180 A1*    10/2005    Devarapalli ...... H04L 29/12066
                                                                                370/328
(Continued)

FOREIGN PATENT DOCUMENTS

CN    103220821    7/2013
CN    103716775    4/2014
(Continued)

OTHER PUBLICATIONS

Pearson Levi: "Stream Reservation Protocol", AVnu Alliance Best practices (Year: 2014).*
(Continued)

*Primary Examiner* — William G Trost, IV
*Assistant Examiner* — Monishwar Mohan
(74) *Attorney, Agent, or Firm* — Cozen O'Connor

(57) ABSTRACT

A method for establishing a stream in a Time-Sensitive Networking (TSN) network, wherein a request message is sent by a stream subscriber to a Domain Name System (DNS) server, upon which entries are stored that each comprise a stream identifier of a first type assigned to a stream, and a stream identifier of a second type that is different from the first type and is assigned to the respective stream, and the specification of a predefined type exclusively used for, or forms these types of entries, where the
(Continued)

request message comprises a stream identifier of the first type and the predefined type known to the at least one stream subscriber, where the stream subscriber receives a response message from the DNS server, which contains a stream identifier of the second type belonging to the stream, and where the stream subscriber logs on to the stream using the stream identifier obtained.

25 Claims, 3 Drawing Sheets

(51) Int. Cl.
*H04L 61/4511* (2022.01)
*H04L 65/65* (2022.01)
*H04L 101/35* (2022.01)

(56) References Cited

U.S. PATENT DOCUMENTS

| | | |
|---|---|---|
| 2006/0227769 A1 | 10/2006 | Veits |
| 2009/0059953 A1 | 3/2009 | Kulkarni |
| 2011/0119306 A1* | 5/2011 | Patil ............... H04L 63/0236 707/783 |
| 2012/0093158 A1 | 4/2012 | Chiba |
| 2013/0282453 A1* | 10/2013 | Jennings ........... H04L 47/806 705/14.7 |
| 2014/0222987 A1* | 8/2014 | Pearson ............ H04L 41/04 709/224 |
| 2015/0109930 A1 | 4/2015 | Duan et al. |
| 2016/0164825 A1* | 6/2016 | Riedel ............... H04L 61/1511 709/223 |
| 2018/0237040 A1* | 8/2018 | Mong ............... B61L 15/0036 |
| 2018/0338265 A1* | 11/2018 | Goel ............... H04W 40/12 |
| 2019/0182554 A1* | 6/2019 | Schupak ......... H04N 21/47217 |
| 2019/0245792 A1* | 8/2019 | Bush ............... H04L 47/24 |
| 2019/0325035 A1* | 10/2019 | Sagui ............... H04L 65/4084 |
| 2020/0014724 A1* | 1/2020 | Venkatasubramanian ........... H04L 63/0236 |
| 2020/0059829 A1* | 2/2020 | Joseph ............ H04W 56/001 |

FOREIGN PATENT DOCUMENTS

| | | |
|---|---|---|
| EP | 2765758 | 8/2014 |
| RU | 2556457 C2 | 7/2015 |
| WO | WO 2014/154036 | 10/2014 |
| WO | WO 2018/101554 | 6/2018 |

OTHER PUBLICATIONS

Pearson Levi: "Stream Reservation Protocol", AVnu Alliance Best practices; pp. 4-19; section 2.7.4 and 2.5.3; 2014.
PCT Search Report dated Nov. 20, 20219 based on PCT/EP2019/071913 filed Aug. 15, 2019.
Office Action dated Jul. 15, 2021 issued in Russian Patent Application No. 2021104053.
Office Action dated Sep. 2, 2021 issued in Korean Patent Application No. 10-2021-7007819.
Office Action dated Sep. 27, 2021 issued in Chinese Patent Application No. 2019800543827.
Office Action dated Jan. 21, 2022 issued in India Patent Application No. 202137006032.

* cited by examiner

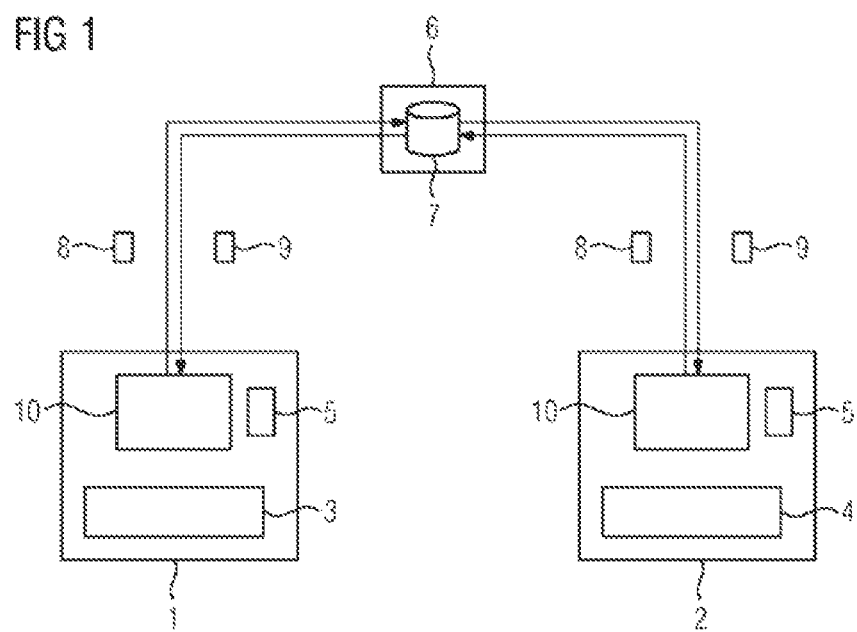
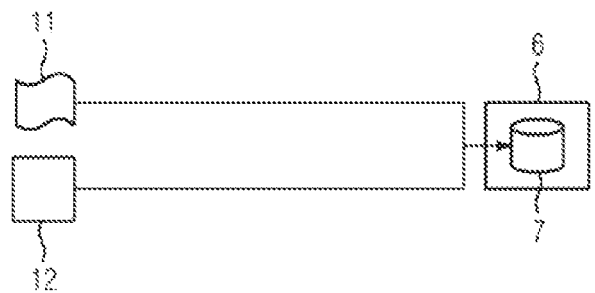

METHOD FOR ESTABLISHING A STREAM, METHOD FOR PROVIDING STREAM IDENTIFICATION INFORMATION, DOMAIN NAME SYSTEM (DNS) SERVER, DEVICE COMPUTER PROGRAM AND COMPUTER-READABLE MEDIUM

CROSS-REFERENCE TO RELATED APPLICATIONS

This is a U.S. national stage of application No. PCT/EP2019/071913 filed 15 Aug. 2019. Priority is claimed on European Application No. 18189716.6 filed 20 Aug. 2018, the content of which is incorporated herein by reference in its entirety.

BACKGROUND OF THE INVENTION

1. Field of the Invention

The invention relates to a method for providing stream identifier information, the use of a DNS server, a device, a computer program and a computer-readable medium and to a method for establishing a stream in a Time-sensitive networking (TSN) network, in particular a network in accordance with Institute of Electrical and Electronics Engineers (IEEE) standard 802.1.

2. Description of the Related Art

As part of the IEEE standardization, Ethernet technology (see IEEE 802) was extended in the audio/video bridging (AVB) workgroup by mechanisms to achieve guaranteed QoS (what is known as "quality of service").

Time-sensitive networking (TSN) denotes a series of standards that, inter alia, extend the bridging standard IEEE 802.1Q by mechanisms for transmitting realtime-critical data via Ethernet networks. The TSN standards include for example time synchronization (IEEE 802.1AS-Rev), frame preemption (IEEE 802.1Qbu) and reservation (IEEE 802.1Qca, IEEE 802.1Qcc) and also further standards.

Within the context of AVB and TSN, quality is intended to be guaranteed by what are known as streams. A stream is a protected communication connection. Before the actual data transmission via a stream, registration and reservation of network resources occurs to allow a loss-free realtime transfer of data frames and a punctual delivery. A reservation of resources for a stream can be performed in particular by what is known as a stream reservation protocol (SRP). SRP is dealt with, for example, in the paper "Stream Reservation Protocol" by Levi Pearson, AVnu Alliance Best Practices, Nov. 3, 2014 (2014-11-03), pages 1-21, XP055449688.

The data stream direction is directed in the TSN stream model. The sending end or source in this case is referred to as a "talker" and the receiving end or sink is referred to as a "listener". On the one hand, it is possible for precisely one "talker" to send data to two or more "listeners" at the same time. On the other hand, two or more "listeners" can send to precisely one "talker" at the same time.

Applications identify the individual streams to time-sensitive networks, more precisely to the TSN control plane, via associated identifiers, in particular what are known as stream IDs. From the point of view of TSN these are bit strings having a length of 64 bits without an internal structure.

So that two or more stream subscribers can connect to a common stream using the same stream ID, all subscribers need to know the stream's associated identifier for the control plane, in particular stream ID.

In the TSN architecture, the stream IDs for stream identification are deliberately chosen to be comparatively short at just 64 bits. This is attributable to the fact that, for technical reasons, all stream IDs need to be known in all nodes of a time-sensitive network, in particular in all TSN bridges within a TSN LAN, in each case and longer stream IDs would quickly exceed the memory budget.

The comparatively short length means that stream IDs are subject to "shortage management".

One way of dealing with the "shortage management" for stream IDs in a network is manual management. This involves, for example, keeping a table, such as an Excel table. This is associated with not inconsiderable complexity, however.

US 2013/282453 A1 discloses a system and a method for streaming media.

Automatic management of stream IDs during operation would also be desirable in particular to be able to add new TSN applications in a network simply via "plug and play" without the need for renewed overall planning of the stream IDs.

SUMMARY OF THE INVENTION

In view of the foregoing, it is therefore an object of the present invention to provide a device and method for establishing a stream in a network, in particular a network in accordance with IEEE standard 802.1, which can be performed with little complexity, and particularly requires no manual management of the stream identifiers used in the control plane.

This and other objects and advantages are achieved in accordance with the invention by a method for establishing a stream in a TSN network, in particular a network in accordance with IEEE standard 802.1, in which at least one stream subscriber seeking to send data via the stream to at least one further stream subscriber and/or seeking to receive data via the stream from at least one further stream subscriber sends a request message to a DNS server upon which entries are deposited that each comprise a stream identifier of a first type assigned to a stream and a stream identifier of a second type, which is different than said stream identifier of a first type, assigned to the respective stream and the indication of a stipulated type that is used exclusively for these types of entries, where the request message comprises at least one stream identifier of the first type, which is known to the at least one stream subscriber, and the stipulated type, in which the at least one stream subscriber receives from the DNS server a response message that contains a stream identifier of the second type associated with the stream, and in which the at least one stream subscriber uses the received stream identifier to register on the stream.

It is also an object of the invention to provide a device including a processor and memory, where the device is configured to send a request message to a DNS server upon which entries are deposited that each comprise a stream identifier of a first type assigned to a stream and a stream identifier of a second type, which is different than said stream identifier of a first type, assigned to the respective stream and the indication of a stipulated type that is used exclusively for these types of entries, wherein the request message comprises at least one stream identifier of the first type, which is known to the device, and the stipulated type, to receive from the DNS server a response message that contains a stream identifier of the second type associated with the stream, and to use the received stream identifier of the second type to connect to an associated stream.

In other words, the present invention provides for two different types of stream identifiers to be used. This makes it possible for the subscribers or application(s) to use a type of stream identifier that differs from the stream identifier used in the control plane. In particular, it is thus possible for the subscribers or application(s) to use an identifier that is much longer than the stream ID used for TSN in the control plane, which is "only" 64 bits long. Additionally, in accordance with the invention, a name service is accessed to assign the subscriber's or application's stream identifiers to the stream identifiers from or for the control plane.

The control plane is intended to be understood in this case to mean in particular the plane in which stream management occurs, for example, stream set-up and clear-down is controlled. What is known as the data plane is used to transport the stream payload data.

This "splitting-in-two" of the stream identifiers allows the applications or devices to use longer names, the size of which exceeds (even significantly) the deliberately short identifiers for the control plane that require storage in the nodes. As such, "shortage management", as may be associated with short identifiers and always necessitates a close comparison of the occupancy, can be avoided at the level of the applications or devices. "Long" names can deliberately be chosen by the devices or applications.

The information about the assignment of the stream identifiers of one type to the stream identifiers of the other type is stored, in accordance with the invention, in entries that are distinguished by a new type intended specifically for this purpose. The entries deposited on the DNS server link one type of stream identifiers to the other.

The entries stored on the DNS server are preferably resource records, where the resource records are in particular part of a file stored on the DNS server.

In accordance with the invention, instead of a type that is previously known from the prior art, for example instead of those types that are defined in RFC 1035 for resource records (RR), for example, of "A", "TXT", "PTR", "NS", "SOA" type, or else types according to other standards, in particular other RFCs, a new type specifically for providing stream identifiers as part of a name service is used in accordance with the invention. This could be referred to as "TSN" type, for example. It is preferably a 16-bit type. The precise value of the type can expediently be specified as part of a standardization, in particular by the Internet Engineering Task Force (IETF) or by the Internet Assigned Numbers Authority (IANA).

It should be noted that RFC stands for Request for Comments of the Internet Engineering Task Force Group (IETF).

The introduction of a new type for name service entries, in accordance with the invention, allows TSN-related information, in particular regarding TSN devices, in the "DNS data budget" to be retrieved and updated simply and smoothly.

In particular, compared to the case in which the information about the assignment of stream identifiers of a first and a second type is deposited in resource records of "TXT" type, as proposed in the European patent application EP 17187473.8, which is likewise ascribable to the applicant, the conditional update of the TSN information in the DNS is simplified because the condition now relates to the TSN information specifically enough instead of to TXT RRs far too unspecifically. TXT RRs are used for many different applications (see in particular RFC 6763) and DNS query operations can filter at most for the RR type. As a result, TSN applications can receive a greater number of TXT RRs as a response, which then first need to be examined for whether and where a TXT RR containing TSN information is located. Especially on I/O devices, it may be that resources needed for this are scarce or require expensive hardware.

In accordance with the present invention, the type specifically intended for TSN information, in particular the resource record type, means that only TSN-specific information is received in response to a request. In particular, only "small" TSN RRs and no other TXT RRs permitted to reach a size of up to 64 K per RR return.

There is also no absolute requirement for TSN-specific subdomains with the approach according to the invention.

If a DNS update is successful, then there is a guarantee that no other information was inadvertently affected and that no other DNS client has itself inadvertently damaged these new data. (Repeated) follow-up for control purposes is unnecessary.

If a DNS update fails, then a single subsequent DNS QUERY can be used to read the TSN stream identifier of the second type already deposited earlier.

Additionally, the approach in accordance with the invention makes it possible, in the course of establishment of an application, for only one or more stream identifiers of a first type to be accessed at first and for the link to a stream identifier of the second type to be made practically only "at the last minute" by using the DNS server. This allows the (planning) processes for the stream identifiers of a first and a second type to be decoupled from one another in terms of organization and time. Identifiers of a first type can therefore be already pre-specified before the final identifiers of a second type that are to be used in the TSN control plane are specified.

Accordingly, there may be provision for the at least one stream subscriber to send the request message only after the establishment of an application in which the stream subscriber participates has been completed, such as by downloading the application to an I/O device from an engineering tool.

The request message sent by the at least one stream subscriber to a DNS server comprises the new, stipulated type used exclusively for entries, in particular resource records, in the name service that each comprise a stream identifier of a first type assigned to a stream and a stream identifier of a second type, which is different than the stream identifier of a first type, assigned to the respective stream, i.e., the TSN- or stream-specific information.

A name service is intended to be understood to particularly mean a service that assigns names, in particular domain names, of devices, computers, or services, to (numerical) IP addresses, for example, IPv4 or IPv6 IP addresses. The domain name system (DNS) is one such service, the main task of which is normally to respond to requests for name resolution, i.e., translation of names into addresses, in particular in IP-based networks. Standards associated with the DNS are in particular RFC 1034 and RFC 1035. A server providing a name service is also referred to as a name service server (nameserver); in the case of DNS it is also referred to as a DNS server.

A DNS server used in accordance with the invention may also be a local DNS server. It is irrelevant "from where" the DNS server provides its service; the service can be provided anywhere so long as there is IP availability (IP connectivity) to the providing DNS server(s). "Local" may be, for example, in the same subnetwork or else anywhere in a cloud, for example, of a company. This freedom or independence is an important trait of a name service, in particular of the DNS.

The transmission of data via stream is effected in a TSN network, this being intended to be understood to mean a network that meets one or more standards referred to as time-sensitive networking (TSN), in particular comprises one or more TSN-compatible nodes, such as switches and/or bridges. The TSN standards include, for example, time synchronization (IEEE 802.1AS-Rev), frame preemption (IEEE 802.1Qbu) and reservation (IEEE 802.1Qca, IEEE 802.1Qcc) and also further standards.

The network is preferably an industrial network, in particular an industrial automation installation.

After the at least one stream subscriber has registered on the stream by using the stream identifier of a second type, data can be sent via the stream.

As far as the reservation intended for streams is concerned, various options previously known from the prior art are available in principle. IEEE 802.1Qcc, for example, describes at least three approaches for these, specifically what is known as a "fully decentralized model", a "fully centralized model", as used for PROFINET IRT, for example, and a hybrid model "centralized network, decentralized user".

The reservation procedure is dependent inter alia on the respective reservation protocol, in particular in accordance with IEEE standard 802.1Qcc. An example that may be cited for a reservation protocol that can be used is MSRP.

It should be understood there may be provision for two or more stream subscribers to send a request message to the DNS server, in which case the request message of each stream subscriber comprises at least one stream identifier of the first type, which is known to the respective stream subscriber, and the stipulated type, and for each stream subscriber to receive from the DNS server a response message that contains a stream identifier of the second type associated with the stream, and for each stream subscriber to use the received stream identifier to register on the stream. The stream identifier of the first type that is known to the stream subscribers and sent with the respective request message may then be the same for all stream subscribers. It is also possible for different stream identifiers of the first type to exist for a stream.

Only precisely one stream identifier normally ever exists or is used for a stream in the control plane. Consequently, multiple entries having different stream identifiers of the first type can then exist on the DNS server for precisely one stream identifier of the second type.

It should also be understood that only one or else multiple streams can be established in a network by performing the method in accordance with the invention.

Stream subscribers may be present in the form of (terminal) devices, for example. Stream subscribers may also be provided by applications or (in particular in the case of distributed applications) application parts.

Two or more stream subscribers may be provided for example by a controller, for example, a programmable logic controller (PLC), and one or more sensors of an automation installation that convey captured measurement data to the PLC via a stream. If there are multiple sensors present that use a stream to send to the PLC, then there is a scenario with multiple talkers and precisely one listener. If data, for example, control values, are intended to be sent from a controller, in particular a PLC, to one or more actuators, for example, then there would be a scenario with precisely one talker and one or more listeners.

Stream subscribers may be subscribers or parts of a distributed application. Sensors/actuators and a PLC can form, e.g., parts of a distributed TSN application "controller".

It should be noted that the two or more stream subscribers may be different (terminal) devices in a network, but it is also possible for these to be on a (terminal) device. It is possible for, e.g., two or more applications or parts of an application that wish to participate in a stream to run on a device that comprises a bridge (possibly a purely software-implemented bridge) or bridge function. This may be the case in the field of virtualizations, for example. Purely by way of illustration a virtual CPU and a human interface (HMI) on a computer may be mentioned.

The stream identifier of a first type is preferably a stream name used by the at least one stream subscriber to identify the stream, preferably a domain name assigned to the stream, in particular an owner name in accordance with RFC 1034 assigned to the stream.

The stream identifier of a first type may be a fully qualified domain name (FQDN), in particular within the context of RFC 7719.

The stream identifier of a first type is also preferably one used by users.

The stream identifier of a first type conveyed from the at least one stream subscriber to the DNS server with the request message in order to request the stream identifier of a second type is known to the at least one stream subscriber. It can be or may have been communicated to the at least one stream subscriber in any way, for example, via allocation by a central location. The stream identifier of a first type may also have been generated by the stream subscriber. Merely by way of illustration reference may be made in this context to the application with the file reference EP 17187473.8, which is likewise ascribable to the applicant and discloses a corresponding method.

The stream identifier of a second type is in particular one that is used in the TSN application plane.

The stream identifier of the second type may be a stream ID, preferably according to IEEE 802.1Qat, which is used by the network, in particular in the (TSN) control plane of the network to identify the stream.

Stream identifiers of the second type also preferably have a size of 64 bits. This ensures that the memory budget in the nodes, such as bridges and/or switches of the network, is not unnecessarily loaded or overloaded.

There may be provision for the network to comprise one or more nodes, in particular bridges and/or switches, and for the stream identifier of the second type to be stored in one or more nodes of the network.

The size of the stream identifier of the first type indicated in bits preferably exceeds the size of the stream identifier of the second type indicated in bits. The choice of "long" or longer stream identifiers of a first type allows defect management on the application plane to be reliably avoided.

In a further embodiment, the request message is sent as a DNS query. Alternatively or additionally, there may be provision for the response message to be sent as a DNS query.

The device in accordance with the invention is appropriately configured in the preferred embodiment.

There are various options for how the entries with the assignment of the stream identifiers of a first type to those of the second type are deposited on the DNS server—for example via DNS updates.

By way of example, there may be provision for the information to be conveyed to the name service server locally by devices or applications that know identifier(s) of both types for one or more streams.

As such, in a further embodiment of the method in accordance with the invention, particularly before the at least one stream subscriber sends the request message to the DNS server, at least one further stream subscriber, which is in particular the initiator of the stream, sends to the DNS server at least one update message that comprises an entry for the name service server that contains at least one stream identifier of the first type and at least one stream identifier of the second type for the stream and an indication of the stipulated type.

The device in accordance with the invention may be appropriately configured to send to a DNS server update messages that comprise an entry for the DNS server that contains at least one stream identifier of the first type and at least one stream identifier of the second type for a stream and an indication of the stipulated type, in particular as a DNS update preferably in accordance with RFC 2163.

The stream identifier of a first type from the update message is preferably provided by a canonical name in accordance with RFC 7719.

The information may alternatively or additionally also come from a central location.

Accordingly, there may alternatively or additionally be provision for, in particular before the at least one stream subscriber sends the request message to the DNS server, a central location to send to the DNS server at least one update message that comprises an entry for the DNS server that contains at least one stream identifier of the first type and at least one stream identifier of the second type for the stream and an indication of the stipulated type.

The entry from the update message comprises not only the stream identifiers of the two types and the indication of the stipulated type but preferably also a class and/or a TTL indication and/or a resource data (RDATA) area having a size of preferably 64 bits.

The entry from the update message is also preferably configured such that the stream identifier of the first type is at the beginning each time and this is followed by the type, the class, the TTL indication and the RDATA area.

In a further preferred embodiment, the stream identifier of the second type is indicated in the RDATA area of the entry, where in particular the stream identifier of the second type is indicated with the most significant octet first, where the most significant bit is counted as bit 0. This corresponds to what is known as the network order. Counting the most significant bit as 0 is consistent with the IETF convention.

The update message is particularly preferably sent to the DNS server in the form of a DNS update in particular according to RFC 2163.

It is a further of the invention to provide a method for providing stream identifier information, in which at least one stream identifier file is provided on a DNS server, where the stream identifier file includes entries that each comprise a stream identifier of a first type assigned to a stream and a stream identifier of a second type, which is different than the stream identifier of a first type, assigned to the respective stream and the indication of a stipulated type that is used exclusively for this type of entries.

The entries that are provided on the DNS server, and that each link a stream identifier of a first type assigned to a stream and a stream identifier of a second type, which is different than the stream identifier of a first type, assigned to the respective stream, and that comprise the indication of a stipulated type used exclusively for this type of entries are preferably distinguished by the same structure, which in the present case is indicated for the entries from the update messages, i.e., preferably additionally comprise a class and/or a TTL indication and/or an RDATA area having a size of preferably 64 bits and are preferably formed such that the stream identifier of the first type is at the beginning each time and the stream identifier is followed by the type, the class, the TTL indication and the RDATA area, and in which in particular the stream identifier of the second type is preferably indicated according to what is known as the network order.

It is an additional object of the invention to provide a Domain Name System (DNS) server for providing a stream identifier file, which includes a processor and memory, where the stream identifier file comprises entries that each comprise a stream identifier of a first type assigned to a stream and a stream identifier of a second type, which is different than the stream identifier of a first type, assigned to the respective stream and the indication of a stipulated type that is used exclusively for this type of entries.

The entries from the stream identifier file can be or may have been conveyed, as described above, either by a central location or locally, for example, by stream subscribers, this preferably being effected or having been effected in the form of updates, in particular DNS updates.

It is also an object of the invention to provide a computer program comprising program code instructions for performing the steps of the method in accordance with disclosed embodiments of the invention for establishing a stream or of the method in accordance with disclosed embodiments of the invention for providing stream identifier information.

Finally, it is also on object of the invention to provide a computer-readable medium that comprises program instructions which, when executed by a processor on at least one computer, prompt the at least one computer to perform the steps of the method in accordance with the disclosed embodiment of the invention for establishing a stream or of the method in accordance with disclosed embodiments of the invention for providing stream identifier information.

The computer-readable medium may be a CD-ROM or DVD or a USB or flash memory, for example. It should be noted that a computer-readable medium is not intended to be understood to mean exclusively a physical medium, but rather such a medium may also be available in the form of a data stream and/or a signal that represents a data stream, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear from the description below of embodiments according to the invention with reference to the accompanying drawings, in which:

FIG. 1 is a purely schematic illustration of two terminals in an industrial network of an automation installation that receive stream identifier information from a Domain Name System (DNS) server in accordance with the invention;

FIG. 2 is a purely schematic illustration of the conveyance of stream identifier information to a name service server in accordance with the invention;

DETAILED DESCRIPTION OF THE EXEMPLARY EMBODIMENTS

Figure 3:
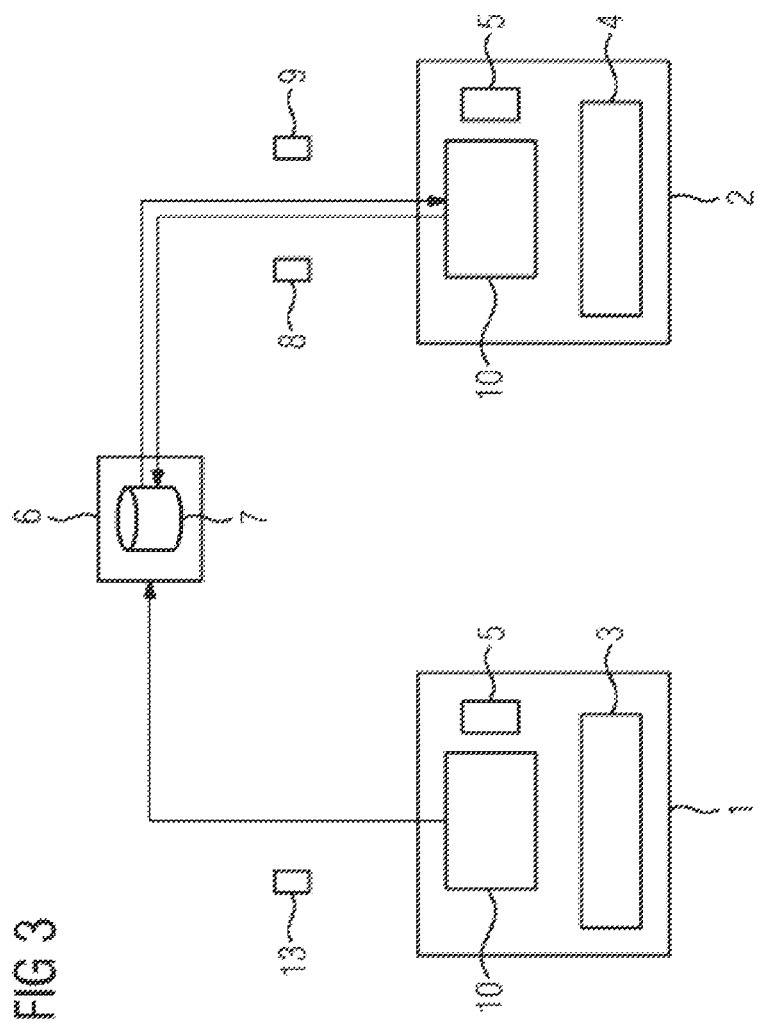
FIG. 3 is schematic illustration of the terminals of FIG. 1, where one terminal performs a DNS UPDATE for the DNS server.

FIG. 1 shows a purely schematic partial depiction of an industrial network, specifically of an automation installation not depicted further in the figures.

The network comprises a multiplicity of subscribers connected via multiple network nodes in the form of TSN-compatible switches, which are not shown in highly simplified FIG. 1. Only two subscribers 1, 2 from the multiplicity of network subscribers are shown in FIG. 1, purely by way of illustration. The left-hand subscriber in FIG. 1 is a terminal 1 in the present case, where the terminal is provided by a programmable logic controller (PLC) 1 of the automation installation. The further subscriber is provided by an I/O device 2 of the automation installation, where the I/O device comprises or is connected to an actuator, which is not shown.

During operation of the automation installation, the PLC 1 cyclically conveys control values to the I/O device 2 in a sufficiently known manner and the actuator cyclically affects a technical process, which is not depicted further, in accordance with the control values.

The data transmission between the PLC 1 and the I/O device 2 needs to occur in real time. Specifically, it is necessary to ensure that the data leaving the PLC 1 arrive at the I/O device 2 without losses in each case after a stipulated time. This is possible as a result of the establishment of a TSN stream, i.e., a protected communication connection between the two subscribers 1, 2.

The PLC 1 sending the data is a talker (sender) and the I/O device 2 is a listener (receiver).

The control process, which requires a data interchange between the PLC 1 and the I/O device 2 in real time with guaranteed quality of service (QoS), can also be deemed a distributed TSN application, with part of the application running on the PLC 1 and part on the I/O device 2. In FIG. 1 the two parts of the TSN application "controller" are indicated by block elements provided with the reference sign 3 or 4.

Applications identify individual streams to time-sensitive networks (TSN), more precisely to the "TSN control plane", via associated stream identifiers, in particular what are known as stream IDs. From the point of view of TSN, these are bit strings having a length of 64 bits without an internal structure.

So that two or more stream subscribers 1, 2 can connect to a common stream using the same stream ID, the subscribers 1, 2 need to know the stream's associated identifier for the control plane, i.e., the stream ID.

In the TSN architecture, the stream IDs for stream identification are deliberately chosen to be comparatively short at just 64 bits. This is attributable to the fact that, for technical reasons, all stream IDs of all streams established in a network need to be known in all involved nodes, such as switches, in each case. If longer stream IDs were used, the memory budget in the nodes would quickly be exhausted or exceeded.

The short length means that stream IDs have to date been subject to "shortage management", which always necessitates a close comparison of the occupancy. This can be prevented via manual management of the stream IDs, by creating an Excel table. This is associated with not inconsiderable complexity, however. Automated management is in particular also desirable to be able to add new TSN applications 3, 4 in a network simply via "plug and play" without the need for renewed overall planning of the stream IDs.

This is made possible in the present case by an embodiment of the method in accordance with the invention for establishing a stream.

Specifically, two different types of stream identifiers are used to identify the streams, i.e., a stream identifier of a first type, which in the present case is a stream name used by the two stream subscribers 1, 2 to identify the stream, specifically an owner name in accordance with RFC 1034 assigned to the stream, which can be distinguished by a size of up to 2040 bits, for example. The stream owner name is known to each of the two stream subscribers 1, 2. In FIG. 1, the stream owner name known to the subscribers 1, 2 is indicated purely schematically by a block element provided with the reference sign 5.

Additionally, a stream identifier of the second type is used, which is the stream ID having a length of 64 bits, in accordance with IEEE standard 802.1Qat, which is used in the control plane of the TSN network to identify streams.

Splitting the identifiers in two on the application and control planes affords the great advantage that firstly the control plane can continue to use stream identifiers of comparatively short length that require storage in all of the nodes involved, and this ensures that the memory budget is not exceeded. The control plane of TSN can thus continue to work with short and hence memory-optimized stream IDs that are automatically replicated by TSN in all involved TSN switches.

Secondly, long stream names can be used by the application, i.e., in the TSN application plane. These require storage only in the individual devices 1, 2, but not in all of the nodes involved. The required memory space for handling a few, therefore longer, identifiers is therefore available in the devices 1, 2. This allows the name space to be deliberately only "thinly occupied" and collisions to be elegantly avoided. This principle is known from the domain name system (DNS) (see in particular RFC 1034 and 1035), for example.

The longer stream identifiers of a first type for the applications and the shorter stream identifiers of a second type for TSN are assigned in accordance with the present invention by accessing a name service server 6. In the presently described exemplary embodiment, this is a DNS server 6, which is depicted in FIG. 1 only purely schematically by a simple block element.

So that assignment using the DNS server 6 is possible, the DNS server 6 stores stream identifier information in addition to the information required for the conventional name service. The stream identifier information additionally available on the DNS server 6 is indicated in FIG. 1 by an element provided with the reference sign 7 on the DNS server 6.

In the presently described exemplary embodiment, the DNS server 6 specifically stores a stream identifier file comprising the additional information. The stream identifier file may be provided, for example, as a zone file in particular in accordance with RFC 1034 and 1035 or as a file created based on such a file, or else may have a different format.

The stream identifier file comprises entries in the form of resource records (RR) that each link a stream identifier of a first type assigned to a stream, in the present case the stream owner name, and a stream identifier of a second type, which is different than said stream identifier of a first type, assigned to the respective stream, in the present case the stream ID used in the TSN control plane, and that each comprise the indication of a stipulated type "TSN" that is used on the name service server 6 exclusively for this type of entries.

The resource records (RR) of the new type "TSN" are established as follows:
1. owner: domain name, see RFC 1034
2. type (16-bit): "TSN"—the precise value is expediently assigned by the IANA in the course of a standardization by the IETF
3. class (16-bit): "IN", see RFC 1034.
4. TTL (32-bit): as defined in RFC 1034.
5. RDATA: 64-bit TSN stream ID (stream identifier) in what is known as network order, that is to say with the most significant octet first, the most significant bit being counted as bit 0(!) according to IETF convention.

It should be noted that the new fields compared to the resource records (RR) previously known from the prior art are highlighted in bold in this list. Previously known resource records are obtained from RFC 1025, for example.
An example of a resource record in this form would be:
rocket-launcher.coyote.acme.corp. TSN IN deadbeef-cafebabe
with the stream owner name "rocket-launcher.coyote.acme.corp", chosen only by way of illustration, in the form of a fully qualified domain name (FQDM) and a 64-bit stream ID, likewise chosen purely by way of illustration as "deadbeefcafebabe", in hexadecimal notation in the RDATA area of the resource record.

It should be noted that the above-described example does not show a value for the TTL ("Time to Live"). This can be 600, for example, corresponding to a TTL of 10 minutes, or else may be different. This value is significant only for DNS caching, but not TSN.

The manner in which the stream identifier information was provided in the DNS will be discussed in more detail later on.

In order to discover the stream ID associated with the stream, both the PLC 1 and the I/O device 2 send a request message 8 to the DNS server 6. This is done specifically in the form of a DNS query. In FIG. 1, the request message or DNS query is indicated as a block element provided with the reference sign 8 beside an arrow pointing to the DNS server 6.

The request messages 8 each comprise the stream identifier of the first type, which is known to the PLC 1 and the I/O device 2, in the form of the stream owner name 5 and the stipulated type "TSN".

For the stream name indicated above by way of illustration the request would be
DNS QUERY:
rocket-launcher.coyote.acme.corp. TSN IN It should be noted that in the present case the PLC 1 and the I/O device 2 know the same stream owner name 5 as stream identifier of a first type. This is not necessarily the case, however. Instead, different subscribers may also know different stream identifiers of a first type for a stream. Multiple resource records then exist for a stream ID as stream identifier of a second type, specifically one RR for each stream identifier of a first type.

In response to the DNS query, both the PLC 1 and the I/O device each receive from the DNS server 6 a response message, in the present case likewise in the form of a DNS query. The response message is shown in FIG. 1 by an element provided with the reference sign 9 beside an arrow pointing from the DNS server 6 to the PLC 1 or the I/O device 2.

In the presently described exemplary embodiment, the PLC 1 and the I/O device 2 each comprise a stream ID module 10 configured to handle the sending of request messages 8 and the receiving of response messages 9, i.e., the DNS queries. The stream ID module 10 is appropriately configured for this purpose. The stream ID module 10 may be purely software-implemented, for example, where the software can then run in particular on general hardware of the devices 1, 2 that is present anyway, or else may be purely hardware-implemented, in particular by hardware specifically intended for the module 10, or else may comprise a combination of software and hardware, in particular hardware specifically intended for the module 10.

The response message 9 received from the DNS server 6 comprises the stream ID associated with the stream. This is taken from the response message 9 by the stream ID module 10 and it is subsequently possible for the PLC 1 and the I/O device 2 to register on the stream using the associated stream ID, and data can be transmitted from the PLC 1 to the I/O device 2 via the stream in real time. The registration on the stream can also be handled via the stream ID module 10, which is then appropriately configured.

It should be noted that, for example, the reservation of resources at the nodes involved and the subsequent transmission or forwarding of data packets can occur exactly in the manner sufficiently well-known from the prior art, which is why these aspects are not discussed more thoroughly.

In the present case, the stream identifier information in the form of the standardized zone file in particular in accordance with RFC 1034 and RFC 1035 was delivered by an engineering tool that was used to set up the network in which the devices 1, 2 depicted in FIG. 1 participate. The zone file was provided via the central engineering tool and subsequently imported by the DNS server 6.

This is depicted purely schematically in FIG. 2. In this figure, the zone file is provided with the reference sign 11, and an arrow pointing from said zone file to the DNS server 6 is used to indicate the import.

By way of example, it is also possible for a direct transfer of DNS data to be effected using the DNS UPDATE operation, in particular in accordance with RFC 2136 "Dynamic Updates in the Domain Name System (DNS UPDATE)".

As an alternative or in addition to an engineering tool being used, a file containing stream identifier information can also be provided by a central online tool and subsequently transmitted to the name service server 6, in particular via a DNS UPDATE operation in accordance with RFC 2136.

FIG. 2 schematically depicts an online tool as a block element provided with the reference sign 12, and an arrow pointing from the online tool to the DNS server 6 is used to indicate the DNS update.

As an alternative to the stream identifier information being conveyed to the DNS server 6 from a central location, the information may also have been conveyed, or can be continually conveyed, to the server 6 locally, by network subscribers that are stream subscribers, likewise via DNS updates. By way of example, it may be that in this manner the identifiers associated with the stream are or have been communicated at least to the respective stream initiator, i.e., to the subscriber announcing or initiating the stream in the network, not via the DNS server 6 but rather in another way.

The stream initiator can then convey to the name service server at least one update message that comprises an entry for the name service server that contains at least one stream identifier of a second type, in particular stream ID, and one or more stream identifier(s) of a first type, in particular domain or owner name.

This can be effected in particular via a DNS update, for example, in accordance with RFC 2136. If each stream initiator conveys the data to a name service server in this way, the data can be retrieved by other subscribers.

The process of DNS UPDATES by a stream initiator is indicated purely schematically in FIG. 3. Here, identical components or elements are provided with identical reference signs.

The DNS UPDATE performed by the PLC 1 that is the stream initiator is depicted by a block element provided with the reference sign 13 beside an arrow pointing from the PLC 1 to the DNS server 6. The DNS UPDATE for the (local) provision of TSN or stream information in the name service is handled by the stream ID module 10 of the PLC 1, which is appropriately configured. The PLC 1 already knows the stream ID. As a result, the PLC 1 no longer requires a DNS query for querying it, as in the scenario shown in FIG. 1.

The I/O device 2 performs a DNS query, however, precisely as in the scenario shown in FIG. 1. Reference may be made to the description above in this regard.

It should be noted that a stream can be initiated either by a talker or by a listener in principle, i.e., the stream initiator may be provided by a talker or listener. In situations with multiple listeners receiving data from precisely one talker or with multiple talkers sending data to precisely one listener, the "single" subscriber, i.e., one talker that has multiple listeners, or one listener for which there are multiple talkers, will be the stream initiator in each case.

Regardless of how the information about the stream identifiers was provided in the DNS server 6, it holds that the use of the new TYPE of entries that was introduced specifically for this purpose, in particular resource records, means that a particularly simple update is possible (in particular in comparison with stream identifier information being stored in resource records of TXT type).

The conditional update of the TSN information is simplified because the condition now relates to the TSN information specifically enough instead of to TXT RRs far too unspecifically. Moreover, no further TSN-specific subdomains are absolutely necessary.

An update can have the following appearance, for example:
DNS UPDATE:
ZONE:
coyote.acme.corp. SOA IN
PREREQUISITES:
(Empty RDATA area signals that there is not yet a requirement or intention for an RRset to exist for TSN).
rocket-launcher.coyote.acme.corp. TSN IN (empty)
UPDATES:
rocket-launcher.coyote.acme.corp. TSN IN deadbeefcafebabe
ADDITIONALS:

An entry from an update message can accordingly comprise not only the stream identifiers of the two types and the indication of the stipulated type but also a class and/or a TTL indication and/or an RDATA area having a size of preferably 64 bits. It may be established, for example, such that the stream identifier of the first type is at the beginning each time and this is followed by the type, the class, the TTL indication and the RDATA area with the stream ID. An example of this is provided by "rocket-launcher.coyote.acme.corp. TSN IN deadbeefcafebabe".

If the DNS UPDATE is successful, then there is a guarantee that no other information was inadvertently affected and that no other DNS client has itself inadvertently damaged these new data. (Repeated) follow-up for control purposes is unnecessary.

If this DNS UPDATE fails then a single subsequent DNS QUERY can be used to read and immediately use the TSN stream ID already deposited earlier:
DNS QUERY:
rocket-launcher.coyote.acme.corp. TSN IN The response TSN RR(s) contain(s) the stream ID(s) sought.

The approach in accordance with the disclosed embodiments of the invention additionally makes it possible, in the course of establishment of an application, for only one or more stream identifiers of a first type to be accessed at first and for the link to a stream identifier of the second type to be made practically only "at the last minute" by using the name service server. This allows the (planning) processes for the stream identifiers of a first and a second type to be decoupled from one another in terms of organization and time. Identifiers of a first type can therefore be already pre-specified before the final identifiers of a second type that are to be used in the TSN control plane are specified.

Figure 4:
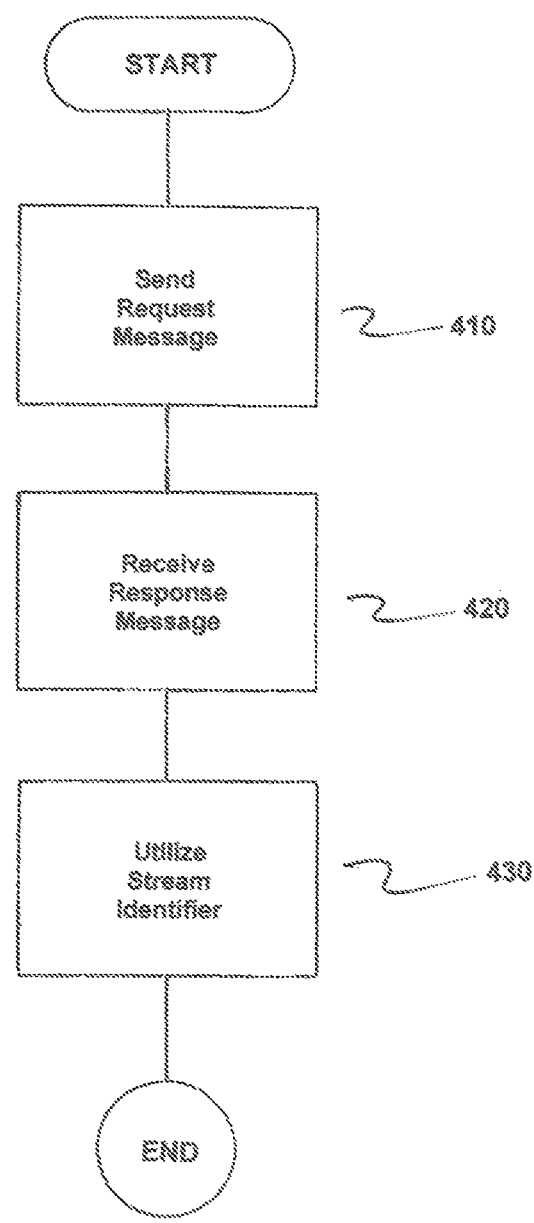
FIG. 4 is a flowchart of the method in accordance with the invention.

FIG. 4 is a flowchart of the method for establishing a stream in a Time-Sensitive Networking (TSN) network. The method comprises sending, by at least one stream subscriber 1, 2 seeking to send data via the stream to at least one further stream subscriber 1, 2 and/or seeking to receive data via the stream from at least one further stream subscriber 1, 2, a request message 8 to a Domain Name System (DNS) server 6 upon which entries are deposited which each comprise a stream identifier of a first type assigned to a stream and a stream identifier of a second type, which is different than said stream identifier of the first type, assigned to a respective stream and an indication of a stipulated type which is used exclusively for this type of entries, as indicated in step 410. In accordance with the method of the invention, the request message 8 also comprises at least one stream identifier of the first type, which is known to the at least one stream subscriber 1, 2, and the stipulated type.

Next, a response message 9, which contains a stream identifier of the second type associated with the stream, is received by the at least one stream subscriber 1, 2 from the DNS server 6, as indicated in step 420.

Next, the received stream identifier is utilized by at least one stream subscriber 1, 2 to register on the stream, as indicated in step 430.

Although the invention has been illustrated and described more thoroughly in detail by the preferred exemplary embodiment, the invention is not limited by the disclosed examples, and other variations can be derived therefrom by a person skilled in the art without departing from the scope of protection of the invention.

By way of example, it should be understood that even though FIGS. 1 and 3 show only two stream subscribers purely by way of illustration, it is accordingly possible for any number of further stream subscribers to register on the stream after they have requested the stream ID by using the DNS server 6.

It is also possible for more than one stream to be established in a network by performing the method in accordance with the disclosed embodiments of invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for establishing a stream in a Time-Sensitive Networking (TSN) network, the method comprising:
    sending, by at least one stream subscriber seeking to at least one of (i) send data via the stream to at least one further stream subscriber and (ii) receive data via the stream from at least one further stream subscriber, a request message to a Domain Name System (DNS) server upon which entries are deposited which each comprise a TSN stream identifier of a first type assigned to a stream and a TSN stream identifier of a second type comprising a multicast media access control (MAC) address, which is different than said TSN stream identifier of the first type, assigned to a respective stream and an indication of a stipulated type which is used exclusively for these types of entries, and the request message comprising at least one TSN stream identifier of the first type, which is known to the at least one stream subscriber, and the stipulated type;
    receiving from the DNS server, by the at least one stream subscriber, a response message which contains the TSN stream identifier of the second type comprising the multicast MAC address associated with the stream; and
    utilizing the received TSN stream identifier of the second type comprising the multicast MAC address associated with the stream by at least one stream subscriber to register on the stream.

2. The method as claimed in claim 1, wherein at least one of (i) the TSN stream identifier of the first type is a stream name utilized by the at least one stream subscriber to identify the stream and (ii) the TSN stream identifier of the second type comprising the multicast MAC address is a stream ID utilized by the network to identify the stream.

3. The method as claimed in claim 1, wherein a size of the TSN stream identifier of the first type indicated in bits exceeds a size of the stream identifier of the second type comprising the multicast MAC address indicated in bits.

4. The method as claimed in claim 2, wherein a size of the TSN stream identifier of the first type indicated in bits exceeds a size of the TSN stream identifier of the second type comprising the multicast MAC address indicated in bits.

5. The method as claimed in claim 1, wherein at least one of (i) the request message is sent as a DNS query and (ii) the response message is sent as a DNS query.

6. The method as claimed in claim 1, wherein entries stored on the DNS server comprise resource records distinguished by a stipulated type.

7. The method as claimed in claim 1, wherein at least one further stream subscriber sends to the DNS server at least one update message comprising an entry for the DNS server which contains at least one TSN stream identifier of the first type and at least one TSN stream identifier of the second type comprising the multicast MAC address for the stream and an indication of the stipulated type.

8. The method as claimed in claim 1, wherein a central location sends to the DNS server at least one update message comprising an entry for the DNS server which contains at least one TSN stream identifier of the first type and at least one TSN stream identifier of the second type comprising the multicast MAC address for the stream and an indication of a stipulated type.

9. The method as claimed in claim 7, wherein the entry from the update message comprises not only the TSN stream identifiers of the two types and the indication of the stipulated type but also at least one of (i) a class, a Time-To-Live (TTL) indication and a resource data (RDATA) area having a preferred size of 64 bits.

10. The method as claimed in claim 8, wherein the entry from the update message comprises not only the TSN stream identifiers of the two types and the indication of the stipulated type but also at least one of (i) a class, a Time-to-Live (TTL) indication and a resource data (RDATA) area having a preferred size of 64 bits.

11. The method as claimed in claim 7, wherein the entry from the update message is configured such that the TSN stream identifier of the first type is at a beginning each time and is followed by a type, a class, a Time-to-Live (TTL) indication and a resource data (RDATA) area.

12. The method as claimed in claim 8, wherein the entry from the update message is configured such that the TSN stream identifier of the first type is at a beginning each time and is followed by a type, a class, a Time-to-Live (TTL) indication and a resource data (RDATA) area.

13. The method as claimed in claim 10, wherein the entry from the update message is configured such that the TSN stream identifier of the first type is at a beginning each time and is followed by the type, the class, the TTL indication and the RDATA area.

14. The method as claimed in one of claim 7, wherein the TSN stream identifier of the second type comprising the multicast MAC address is indicated in a resource data (RDATA) area of the entry.

15. The method as claimed in claim 7, wherein the update message is sent to the DNS server in the form of a DNS update.

16. The method as claimed in claim 1, wherein the at least one stream subscriber comprises a subscriber of a distributed application.

17. The method as claimed in claim 1, wherein the TSN network comprises at least one node, and the TSN stream identifier of the second type comprising the multicast MAC address is stored in the at least one node of the TSN network.

18. A method for providing stream identifier information, the method comprising:
    providing at least one stream identifier file on a Domain Name System (DNS) server;
    wherein the stream identifier file includes entries each comprising a in a Time Sensitive Networking (TSN) stream identifier of a first type assigned to a stream and a TSN stream identifier of a second type comprising a multicast media access control (MAC) address, which is different than said TSN stream identifier of the first type, assigned to the respective stream and the indication of a stipulated type which is utilized exclusively for these types of entries.

19. A Domain Name System (DNS) server for providing a stream identifier file, comprising:
a processor; and
memory;
wherein the stream identifier file comprises entries that each comprise a in a Time Sensitive Networking (TSN) stream identifier of a first type assigned to a stream and a TSN stream identifier of a second type comprising a multicast media access control (MAC) address, which is different than said TSN stream identifier of the first type, assigned to the respective stream and the indication of a stipulated type that is used exclusively for these types of entries.

20. A device comprising:
a processor; and
memory;
wherein the device is configured to:
send a request message to a Domain Name System (DNS) server upon which entries are deposited which each comprise a Time Sensitive Networking (TSN) stream identifier of a first type assigned to a stream and a TSN stream identifier of a second type comprising a multicast media access control (MAC) address, which is different than said TSN stream identifier of the first type, assigned to the respective stream and the indication of a stipulated type which is utilized exclusively for these types of entries, and the request message comprising at least one TSN stream identifier of the first type, which is known to the device, and the stipulated type;
receive from the DNS server a response message which contains a TSN stream identifier of the second type comprising the multicast MAC address associated with the stream; and
utilize the received TSN stream identifier of the second type comprising the multicast MAC address to connect to an associated stream.

21. The device as claimed in claim 20, wherein at least one of (i) the TSN stream identifier of the first type comprises a stream name utilized by the device to identify the stream and (ii) the TSN stream identifier of the second type comprising the multicast MAC address further comprises a stream ID utilized by a TSN network to identify the stream.

22. The device as claimed in claim 20, wherein the device is further configured to at least one of (i) send the request message as a DNS query and (ii) receive a response message as a DNS query.

23. The device as claimed in claim 21, wherein the device is further configured to at least one of (i) send the request message as a DNS query and (ii) receive a response message as a DNS query.

24. The device as claimed in claim 20, wherein the device is further configured to send to the DNS server update messages which include an entry for the DNS server that contains at least one stream identifier of the first type and at least one stream identifier of the second type for a stream and an indication of the stipulated type.

25. A non-transitory computer-readable medium encoded with program instructions which, when executed by a processor on at least one computer, prompt the at least one computer to establish a stream in a Time-Sensitive Networking (TSN) network, the program instructions comprising:
program code for sending, by at least one stream subscriber seeking to at least one of (i) send data via the stream to at least one further stream subscriber and (ii) receive data via the stream from at least one further stream subscriber, a request message to a Domain Name System (DNS) server upon which entries are deposited which each comprise a TSN stream identifier of a first type assigned to a stream and a TSN stream identifier of a second type comprising a multicast media access control (MAC) address, which is different than said TSN stream identifier of the first type, assigned to a respective stream and an indication of a stipulated type which is used exclusively for these types of entries, and the request message comprising at least one TSN stream identifier of the first type, which is known to the at least one stream subscriber, and the stipulated type;
program code for receiving from the DNS server, by the at least one TSN stream subscriber, a response message which contains the TSN stream identifier of the second type comprising the multicast MAC address associated with the stream; and
program code for utilizing the received TSN stream identifier of the second type comprising the multicast MAC address by at least one stream subscriber to register on the stream.

* * * * *